Feb. 8, 1966     K. W. COWANS     3,233,426
EXPANSION ENGINE

Original Filed July 23, 1964     3 Sheets-Sheet 1

INVENTOR.
KENNETH W. COWANS,
BY Robert Thompson
ATTORNEY

Feb. 8, 1966     K. W. COWANS     3,233,426
EXPANSION ENGINE

Original Filed July 23, 1964     3 Sheets-Sheet 2

INVENTOR.
KENNETH W. COWANS,
BY Robert Thompson
ATTORNEY

Feb. 8, 1966     K. W. COWANS     3,233,426
EXPANSION ENGINE
Original Filed July 23, 1964                 3 Sheets-Sheet 3
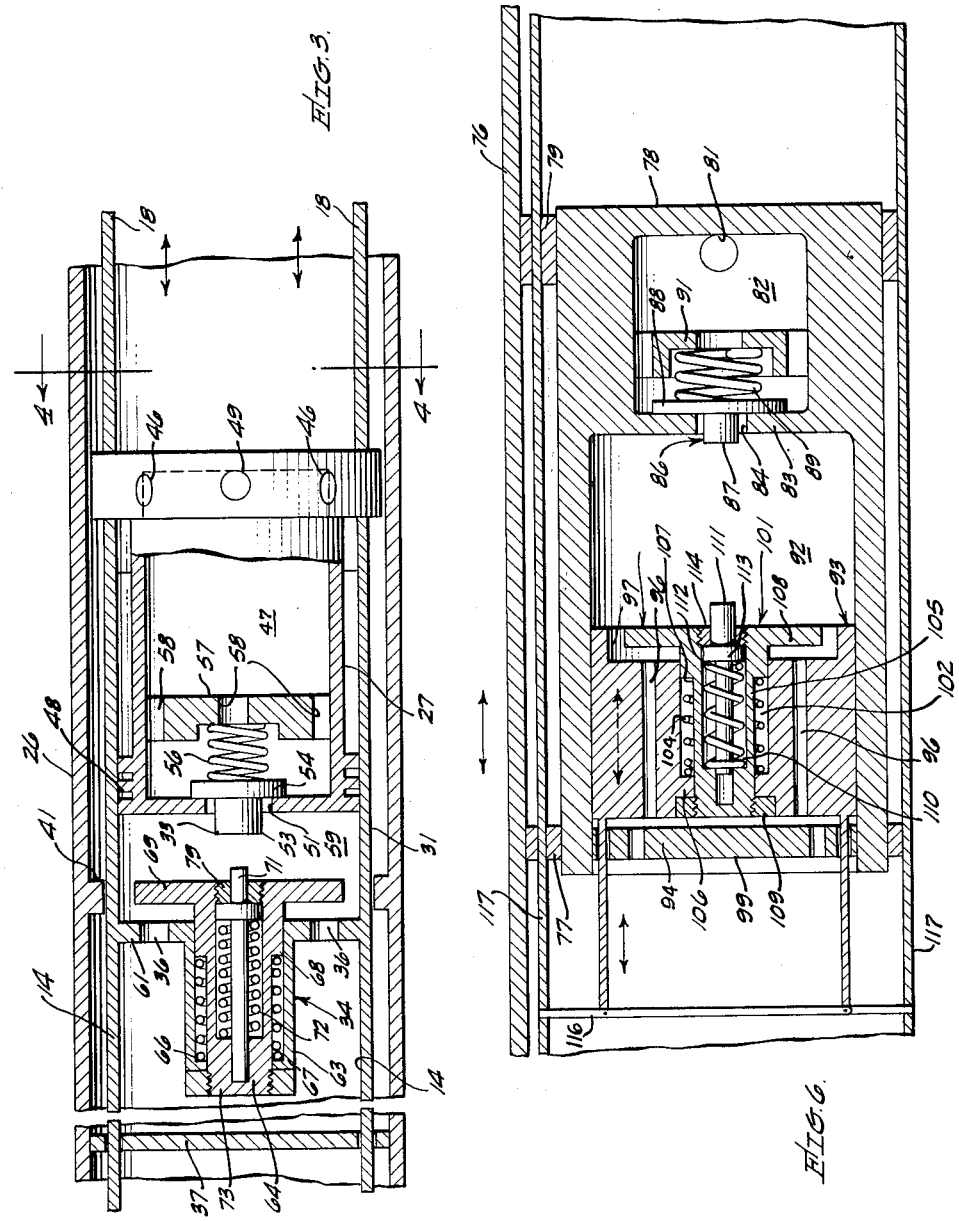
INVENTORS.
KENNETH W. COWANS,
BY
Robert Thompson
ATTORNEY.

United States Patent Office 3,233,426
Patented Feb. 8, 1966

3,233,426
EXPANSION ENGINE
Kenneth W. Cowans, Playa Del Rey, Los Angeles, Calif., assignor to Hughes Aircraft Company, Culver City, Calif., a corporation of Delaware
Continuation of application Ser. No. 384,729, July 23, 1964. This application Aug 2, 1965, Ser. No. 477,660
20 Claims. (Cl. 62—403)

This application is a continuation of Kenneth W. Cowans, Serial No. 384,729, filed July 23, 1964, entitled Expansion Engine.

This invention relates to an expansion engine and more particularly to an improved adiabatic expansion engine from which cryogenic refrigeration can be obtained as compressed gas does mechanical work.

In cryogenic expansion engines, unwanted heat conduction usually occurs between the high temperature outermost regions of the engine and the relatively cool expansion chamber. Two of the most troublesome heat conductors are the valve actuators and the drive shaft or power takeoff rods. The reason for this heat conduction is that both the valve actuators and the drive shafts usually have a large temperature gradient between the end nearest the expansion chamber and the end nearest the engine exterior.

Another problem with expansion engines is that the incoming gases lose some energy as a result of the cooling effects from the previously expanded gas. This energy loss is especially prevalent in conventional expansion engines which have both the intake valve and the exhaust valve located at the same end of the expansion chamber. As a result as the inlet gases enter the chamber they expand, and cool down the expansion chamber walls slightly. After the expanded gases are exhausted the walls still remain cool. Thereafter, the next charge of inlet gases will lose or give up some of its heat to the cold chamber walls, causing the wall surface to first warm up and then, as the gases expand, cool down. As a result, the heat content of the expansion chamber wall fluctuates thereby using up some of the energy potentially available in the gases.

Accordingly, it is an object to solve the above problems in a new and materially better manner without affecting the overall operating characteristics of the expansion engine.

Another object is to increase the efficiency of an expansion engine by reducing heat conduction between the expansion chamber and the relatively warm exterior regions of the engine.

Still another object is to reduce the number and size of the heat conducting paths from the interior of the engine.

An additional object of this invention is to reduce heat conduction along the valve stems.

Yet another object is to simplify the engine valve arrangement and reduce the size of the engine enclosure while only requiring a small amount of exterior gas flow piping while at the same time providing a good thermal-match between the inlet and exhaust gas piping and a heat exchanger.

Another object of this invention is to reduce the energy loss resulting from a wide heat energy fluctuation at the expansion chamber walls during each cyclic of operation.

Still another object is to provide an improved internally actuated valve arrangement for an expansion engine.

The above and other objectives of the invention can be accomplished by providing a heat exchanger which supplies compressed gases to an expansion engine of the type having a piston mounted for reciprocal motion relative to a closed end cylinder. A normally closed intake valve and a normally open exhaust valve are mounted to the above elements at opposite ends of the engine expansion chamber and are directly actuated by direct mechanical contact with one another. In operation reciprocal motion of the piston relative to the cylinder first closes the exhaust valve and then a short time later opens the intake valve when the piston reciprocally travels toward top-dead-center. Beyond top-dead-center the valves lose contact with one another and the intake valve closes to seal a charge of compressed gas in the expansion chamber. Near bottom-dead-center the exhaust valve co-acts with stationary mechanical member and is kicked open. Because of the direct mechanical actuation of the valves by one another, it is possible to eliminate long valve actuators which extend between the engine and the outside environment thereby reducing heat conduction to the cold expansion chamber.

In operation the compressed inlet gas which is fed unidirectionally through the engine expands and cools down whereupon the piston is driven reciprocally relative to the cylinder. Upon approaching bottom-dead-center, a kicker member opens the exhaust valve and the expanded and cooled gases are exhausted back to a counter current heat exchanger which operates to cool down the incoming gases and to provide low temperature refrigeration.

For tandem or series operation, a plurality of expansion engines can be connected to one another by reciprocal drive or power take-off rods which are only subjected to mechanical tension as they transmit power. As a result of the drive shaft or rods being only subjected to tension it is possible to reduce the cross-sectional area of shafts or rods thereby reducing heat conduction and losses along the shaft to a minimum.

Other objects, features and advantages of this invention will become apparent upon reading the following detailed description of two embodiments of this invention and referring to the accompanying drawings in which:

FIG. 3 is an enlarged side elevational view partly in cross-section of the reciprocal cylinder expansion engine of FIG. 2 showing the details of the valve arrangement and elements;

FIG. 6 is an enlarged side elevational view partly in cross-section of a second embodiment of the engine in which the piston is mounted for reciprocal motion within a stationary cylinder.

Figure 1:
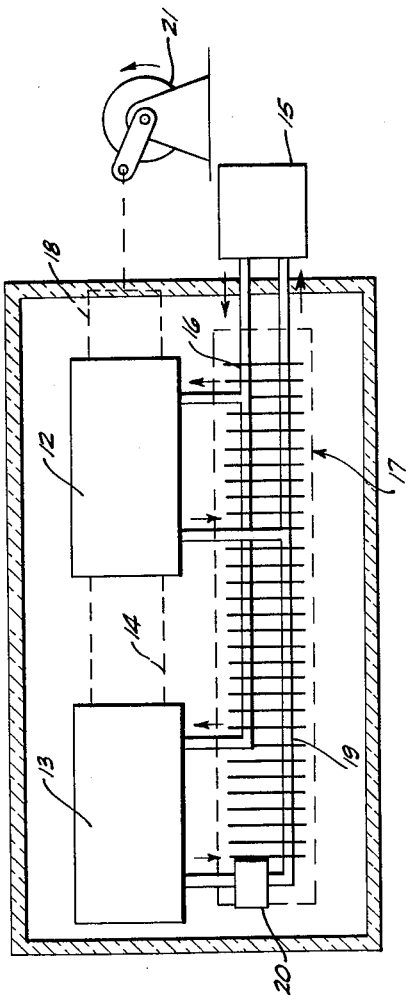
FIG. 1 is a schematic diagram illustrating the function relationship between the tandem connected expansion engines, the heat exchanger and a mechanism which converts the engine work from reciprocal motion to rotary motion.

Referring now to FIG. 1 there is illustrated schematically a pair of expansion engines 12 and 13 which are connected in tandem by tension rods 14. Energy in the form of compressed gas is supplied to the expansion engines 12 and 13 from a compressed gas source such as a compressor 15 by means of an inlet manifold 16 of a heat exchanger 17. As the engines receive the compressed gas, gas expansion occurs and a piston which is slidably mounted within a cylinder (not shown) is driven reciprocally relative to the cylinder to exert a pull or tension force on the interconnecting tension rods 14 and an output drive shaft 18. During this expansion the compressed gas cools and is thereafter exhausted from the expansion engines 12 and 13 into an exhaust manifold 19 of the heat exchanger 17. This expanded exhaust gas is at a very low temperature and acts as a refrigerant. The output of tension rod 18 is converted from reciprocal motion to rotary motion by a conventional work absorber mechanism 21 so that both of the tension rods 14 and output shafts 18 are pulled or subjected to mechanical tension rather than compression whether work is being transmitted from the engine to the work absorber 21 during expansion or work is being transmitted from the work absorber 21 to the engine during the exhaust portion of the cycle. The work absorber 21 is basically a flywheel and a brake so that work is performed by the engines during expansion.

For efficient operation the two expansion engines 12 and 13 then tension rod 14, the heat exchange 17 and the heat load 20 can be enclosed within the hollow chamber of an insulating housing. About one-half of the compressed gas expands and cools in the first expansion engine 12 and is exhausted to the exhaust manifold of the countercurrent heat exchanger 17. As this cold expanded gas is exhausted from the heat exchanger to the source of compressed gas 15 heat is transferred from the compressed incoming gas to the cold expanded gas thereby substantially decreasing the temperature of the incoming gas before it is fed to the first expansion engine. The second expansion engine 13 operates in the same manner upon the remaining one-half of the incoming gas to further reduce the gas temperature by expansion and heat transfer. The expanded gas, as it is exhausted from the second expansion engine 13, is coldest and is used to refrigerate the heat load 20.

Figure 2:
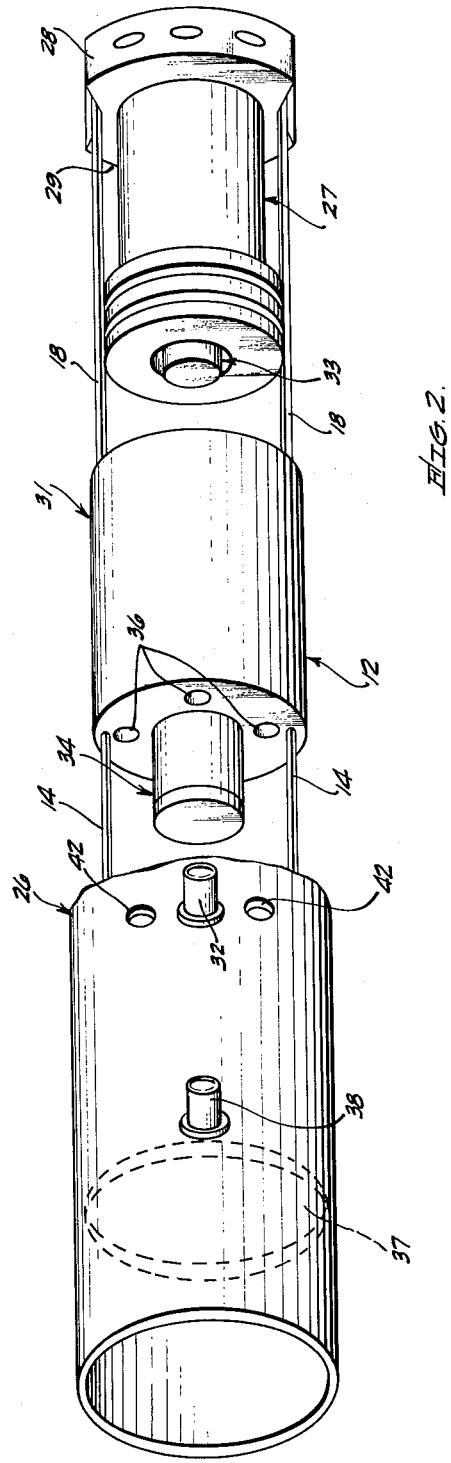
FIG. 2 is a perspective exploded view of a preferred embodiment of an expansion engine showing a hollow outer casing a reciprocal hollow cylinder and a stationary piston.

Referring now to the expansion engine in more detail, FIG. 2 illustrates an exploded perspective view of a preferred stationary piston-reciprocal cylinder embodiment of the expansion engine. Basically, the expansion engine 12 includes an outer housing 26 which has a smaller diameter hollow piston 27 secured within it by means of conventional fasteners extending through the housing wall and into a pair of radially projecting ears 28 and 29. A hollow cylinder 31 having a closed end forming a cylinder head is of an intermediate diameter to slidably fit between the inner wall of the outer housing 26 and the piston 27 so as to slidably enclose the stationary piston 27. During operation the hollow cylinder 31 is reciprocated relative to the stationary piston 27 so that a variable volume expansion chamber 59 (FIG. 3) is formed between the piston head 27a and the closed walls of the hollow cylinder 31. Compressed gas is continuously fed through the hollow stationary piston 27 by means of a feeder pipe 32 and an aperture extending radially through the ear 28. An inlet valve 33 projects axially into the expansion chamber 59 from the piston head 27a and is opened when the expansion chamber is near its smallest volume or is top dead center by direct mechanical contact with an exhaust valve 34 which projects axially from the cylinder into the expansion chamber 59. The exhaust valve 34 also extends axially outward from the end wall of the hollow cylinder 31 so that it is opened thereby allowing the expanded gas to escape from the expansion chamber through a plurality of outlet ports 36 in the cylinder end wall when the exhaust valve 34 abuts a kicker bulkhead or radially extending wall 37 secured across the bore of the outer housing 26. Once the exhaust valve 34 is opened the expanded cool gas is exhausted from the space formed between the cylinder 31 and the bulkhead 37 by means of an exhaust pipe 38 and is fed back to the heat exchanger (not shown). Thermal insulation can be mounted about the outer surface of the outer housing 26 to maintain low temperature operation of the expansion engine.

Figure 4:
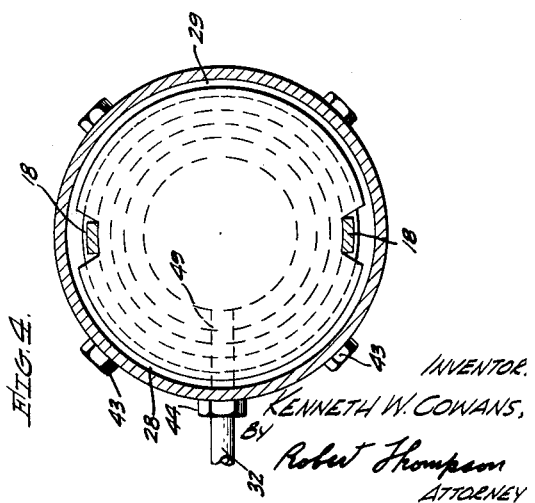
FIG. 4 is a cross-sectional end elevational view of the expansion engine taken along the line 4—4 of FIG. 3.

Referring now to the details of the stationary piston, reciprocating cylinder expansion engine 12 illustrated in FIGS. 2–4, the outer housing 26 is illustrated in section to more clearly show the engine interior. The outer housing 26 is hollow and has an annular land 41 extending circumferentially about its inner wall. Three spaced apart apertures 42 are formed through the wall of housing 26 on each opposite wall side. Two of these holes are adapted to receive conventional fasteners such as screws for machine bolts 43. The central aperture 42 is adapted to receive a threaded nipple 44 or other threaded pipe connected for receiving a gas feeder pipe 32. An exhaust aperture is formed through the wall of outer housing 26 and is spaced longitudinally from the other apertures. This aperture is adapted to receive an exhaust pipe 38 (FIG. 2) which communicates with the interior portion of housing 26.

The stationary piston 27 is secured within outer housing 26 by means of the fasteners 43 extending through the apertures 42 and into the threaded blind holes 46 which are formed in the pair of radially projecting piston ears 28 and 29. The stationary piston 27 is formed with a hollow chamber 47 which is in fluid communication with the gas feeder pipe 32 by means of a passageway and inlet port 49 extending radially through the piston ear 28. The piston side wall nearest the piston head is formed with a plurality of circumferentially extending grooves 48 which can be adapted to receive a low temperature piston seal (not shown). The remaining portion of the piston walls is thin to reduce heat flux at the cryogenic operating temperatures. The piston head is formed with an aperture 51 extending axially therethrough.

The inlet valve 33 having a short stem 53 and a wide flat head 54 is seated across the aperture 51. A coil spring 56 which is compressed between the top of valve head 54 and apertured spring support web 57 biases the inlet valve 33 to a normally closed position.

In operation compressed gas is supplied to the piston chamber 47 through the inlet aperture or pipe 32 and port 49 and is maintained within the chamber 47 until such time as the inlet valve 33 is opened (as will be explained shortly). When the inlet valve 33 opens gas flows through the apertures 58 in spring support web 57 past the valve head 54 and out through the inlet port 51 into an expansion chamber 59.

The reciprocating cylinder 31 is slidably mounted in a concentric annular relationship between the outer housing 26 and the inner piston 27. The outer wall of the reciprocating piston 31 abuts the inner surface of the annular land 41 in a gas-tight low friction relationship while the inner surface of the cylinder abuts the grooved end of the piston head 27a in a low friction gas-tight relationship. The pair of interconnecting drive shafts 14 or rods are formed to project longitudinally from one end of the cylinder 31 and the pair of output shafts or rods 18 are formed to project longitudinally from the other end of the cylinder 31. A closed end wall 61 is formed with a plurality of apertures 36 which permit expanded gas which is entrapped in the expansion chamber 59 formed between piston head and the interior walls of the cylinder 31 to escape at such times as the exhaust valve 34 is in the open position shown.

The exhaust valve 34 which extends axially through the cylinder head or end wall 61 is closed by direct mechanical contact with the inlet valve 33 at one end of the stroke and is opened by direct mechanical contact with the kicker bulkhead 37 at the other end of the stroke.

Referring to the exhaust valve 34 in more detail, a hollow boss 63 is formed to project axially outward from a cylinder end wall or head 61 to provide a guide for an exhaust valve stem 64 and form an annular space for retaining a valve coil spring 66. The valve coil spring 66 is disposed around the exhaust valve stem 64 and is compressed between an inward projecting land 67 formed toward the outermost end of the boss 63 and a flange 68 formed about the valve stem 64 adjacent a flat valve head 69. The flat circular valve head 69 is formed at the innermost end of the valve stem 64 and is slidably mounted so that the valve spring 66 normally unseats the head away from the exhaust ports 36. When, however, the expansion chamber 59 contains a charge of compressed gas the gas pressure on the valve head 69 develops a force which maintains the exhaust valve 34 seated across the exhaust ports 36 against the counter-acting force of the spring 66.

A plunger 71 is reciprocally mounted coaxially within the exhaust valve 34 and is spring-biased by coil spring 72 to project into the expansion chamber from the exhaust valve head 69. Plunger coil spring 72 is under compression within the bore chamber formed within the exhaust valve stem and a collar on the plunger 71. An important feature of this invention is that spring 72 has a higher force than spring 66 or spring 56.

In operation the plunger 71 is adapted to hold open the inlet valve 33 for a predetermined distance beyond top-dead-center after the inlet valve has been opened, prior to top-dead-center, by direct mechanical contact between the exhaust valve head 69 and the inlet valve stem 53. Near bottom-dead-center, when the expansion chamber has its greatest volume, an end plate 73 connected to the end of the closed exhaust valve abuts the kicker bulkhead 37 which is connected across the bore of the outer housing 26 to unseat the closed exhaust valve 34 and open the exhaust ports 36.

In operation compressed gas is continually fed to the piston chamber 47 through inlet port 49 in the manner previously described. During the compression stroke the drive rods 18 are pulled to the right by the previously described work absorber (FIG. 1) thereby drawing the reciprocating cylinder 31 to the right whereupon the volume of the expansion chamber 59 decreases. Near the end of this exhaust stroke the plunger 71 abuts the stem 53 of the intake valve 33. Further motion of the reciprocating cylinder 31 forces the compression of the exhaust valve spring 66 under the influence of the higher force of plunger spring 72 thereby closing the exhaust valve 34. Still further cylinder motion occurring after the closure of the exhaust valve 34 forces the plunger spring 72 to compress under the counteracting force exerted through the inlet valve stem 53 which is in turn held firmly by the combined force of the inlet valve spring 56 and the high gas pressure within the hollow piston 27. During this time the expansion chamber 59 is sealed and any gas contained therein is compressed. After cylinder motion has forced the plunger 71 to retract to the level of the surface of exhaust valve head 69 the inlet valve stem 53 is contacted by the valve head whereupon further cylinder motion unseats the inlets valve 33 against the force of intake valve spring 56. Thereafter inlet valve 33 opens under the action of exhaust valve 34 which has been seated against the moving cylinder. With exhaust valve 34 closed and inlet valve 33 open the gas pressure on each side of the inlet valve 33 is substantially equal whereupon the force of plunger spring 72 maintains the inlet valve 33 open against the lower level counteracting force of the inlet valve spring 56. Thus, the inlet valve 33 is held open beyond top dead center of the reciprocating cylinder 31 relative to the stationary piston 27. As the cylinder 31 moves beyond top dead center plunger 71 is spring extended to the limits of its travel by abutting the plunger stop 74 whereafter further motion of the reciprocating cylinder 31 moves the plunger out of contact with the inlet valve stem and allows inlet valve spring 56 to close the inlet valve 33. After this inlet valve closure further motion of reciprocating cylinder 31 allows the gas pressure within the now sealed expansion chamber 59 to decrease as the gas expands. As the compressed gas expands it cools down sufficiently to provide refrigeration. Near or at the end of the expansion stroke the exhaust valve end plate 73 abuts the kicker bulkhead 37 to open the exhaust valve 34 with the aid of the exhaust valve spring 66 whereupon the expanded cool gas in the expansion chamber 59 escapes through the exhaust ports 36 and is thereafter removed from the engine through the exhaust pipe 38 (FIG. 2).

During this expansion cycle the drive shaft or power take-off rods 18 are pulled to the left and are under tension to transfer work to the work absorber mechanism (FIG. 1). Thus, the power take-off rods are under tension during the entire engine cycle. An important advantage of subjecting only the rods 14 and 18 to tension is that they can be made with a small cross-sectional area thereby keeping heat conduction along the rods to a low level.

After the end of the expansion stroke the reciprocating cylinder 31 is again drawn to the right by the power take-off rods 18 which are under tension from the pulling forces of the energy absorber mechanism 21. During this return stroke, the exhaust valve 34 remains open and any expanded gas contained in the expansion chamber 59 is exhausted through the exhaust ports 36. At or near the end of this exhaust stroke the plunger 71 again contacts the intake valve 33 to seat the exhaust valve 34 and close the exhaust ports 36 thereby entrapping some gas within the expansion chamber 59. Thereafter, the above-described cycle is repeated thereby obtaining refrigeration from the expanding gas as the gas does some work.

Figure 5:
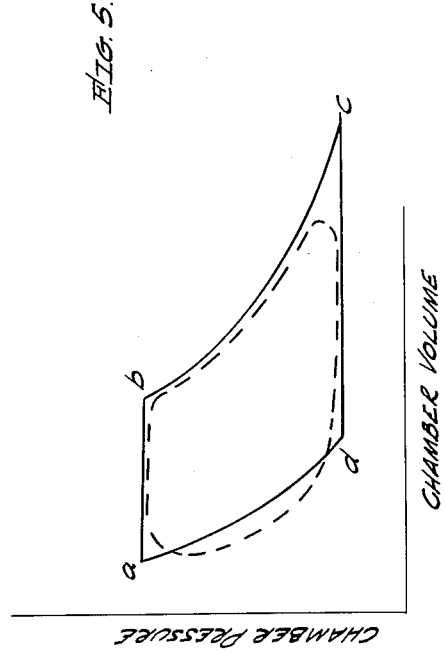
FIG. 5 is a graphic illustration of the pressure-volume relationship of the expansion engine during a complete cycle.

The above-described operation is illustrated graphically by the pressure-volume graph of FIG. 5 in which the solid line illustrates the ideal gas relationship and the dotted line represents the probable actual operation. At point "a" of the graph the piston or cylinder is at top dead center with the intake valve 33 open and exhaust valve 34 closed. Between points "a" and "b" compressed gas is flowing into the expansion chamber 59 at a constant pressure thereby increasing the chamber volume without decreasing the chamber pressure. At point "b" of the graph, the inlet valve 34 is closed, as previously described. Between "b" and "c" the pressure of the gas within the closed expansion chamber develops a force which drives the reciprocating cylinder 31 to the left thereby increasing the volume of expansion chamber 59 while at the same time decreasing the chamber pressure. At point "c" of the graph the exhaust valve 34 is opened by abutting the kicker bulkhead 37 whereupon gas expansion ends as gas is exhausted. With the exhaust valve 34 open the piston 31 is drawn to the right ("c" to "d") whereupon the expanded gas within the expansion chamber is exhausted. At point "d" of the graph the exhaust valve is again closed thereby compressing the gas remaining in the expansion chamber until such time as the inlet valve 33 is again opened at point "a" of the graph. Thereafter, this cycle is continued.

Referring now to the reciprocating piston, stationary cylinder expansion engine embodiment illustrated in cross-section in FIG. 6, the ends of the outer housing 76 are shown broken away to reduce the figure length to a convenient size for the drawing. An outer housing 76 is hollow having a bore with an annular land 77 extending circumferentially about its inner wall.

A stationary cylinder 78 is secured within the housing bore with one end thereof inserted within the annular land 77 in a gas-tight fit. An end portion of the cylinder side wall remote from the land 77 is formed with a circumferentially extending flange 79 which is dimensioned to closely fit the bore wall of the outer housing 76. As in the previously described embodiment of an expansion engine a plurality of conventional screw type fasteners (not shown) are inserted through apertures (not shown) in the outer housing 76 and threadably fastened into spaced apart tap holes (not shown) in the flange 79. A gas inlet passageway and port 81 is formed through the wall of outer housing 76 and the wall of cylinder 78 to provide a path for gas communication with a gas chamber 82 formed at one end of the cylinder 78. A wall 83 extends radially across one end of the gas chamber 82 and has a gas intake port 84 formed therethrough.

An intake valve 86 having a short stem 87 and a relatively wide flat circular head 88 is mounted in the intake port 84 so that the flat valve head 88 seats across the port when in the closed position. The intake valve 86 is maintained in the normally closed position by a valve coil spring 89 compressed between the valve head 88 and an apertured spring seat 91 which is in turn secured radially across the gas chamber 82.

The remaining portion of the cylinder 78 is bored out to form an expansion chamber 92 having a piston 93 slidably mounted for reciprocal motion therein. The downstream or far end of the cylinder bore is closed by a kicker bulkhead or flat wall 94 secured to extend across the bore.

The piston 93 is substantially solid and is mounted within the expansion chamber for gas-tight, low-friction sliding motion axially therein. The piston body is formed with a plurality of gas exhaust passageways 96 which are displaced from the central piston axis and extend longitudinally therethrough. The piston head is formed with a valve seat 97 which is adjacent the expansion chamber 92 so that the exhaust passageways 96 are opened and closed by the actuation of an exhaust valve 101 mounted concentrically within the piston 93 and adapted to project from the piston head into the expansion chamber 92.

Referring to the arrangement of the exhaust valve 101 in more detail, a valve guide chamber 102 is formed concentrically within the piston 93 and is adapted to receive a valve stem 105. A coil spring 104 is mounted under compression between a land 106 at the bottom of the valve guide chamber and a flange 107 formed about the valve stem just adjacent a wide flat valve head 108. The exhaust valve spring 104 maintains or biases the valve head 108 axially outward from the piston head to maintain the exhaust valve 101 in a normally opened position. The end of the valve stem opposite the valve head 108 has a stopper plate 109 threadably secured to it and adapted to fit within a recess in the piston end wall, whenever the exhaust valve 101 is unseated. The interior of the exhaust valve 101 is bored out to provide a guide 110 for receiving a reciprocally mounted plunger 111.

The plunger is mounted to project from the valve head into one end of the expansion chamber 92 in coaxial alignment with the intake valve 86 at the other end of the expansion chamber. A plunger coil spring 112 is mounted under compression between a land at the bottom of the plunger guide 110 and a flange 113 near the end of plunger 111. An apertured cap 114 is threaded across the mouth of the plunger guide 110 adjacent the valve head and is adapted to retain the plunger 111 within the guide. An important feature of the valve arrangement is that the force of plunger spring 112 is greater than the force of either the exhaust valve spring 104 or the intake valve spring 89.

The operation of the above-described reciprocating piston stationary cylinder expansion engine is similar to the operation of the previously described stationary piston reciprocating cylinder expansion engine and is also graphically illustrated by the pressure-volume graph of FIG. 5. Referring to FIGS. 5 and 6, when the piston 93 is near top dead center and the volume of expansion chamber 92 is smallest, the plunger 111 and the intake valve head 86 abut to close the exhaust valve 101. Additional movement of the piston 93 retracts the plunger 111 into the exhaust valve 101 whereupon the valve head 108 of the seated exhaust valve 101 mechanically abuts the valve stem 87 of the seated intake valve 86. Further piston movement toward top dead center forces intake valve 86 open against the counteracting force of intake valve spring 89 and the gas pressure thereby allowing compressed gas to flow into the expansion chamber 92 at a constant pressure through: the inlet port 81; the gas chamber 82; the apertured spring seat 91; and the intake port 84. These conditions are illustrated at points "$a$" through "$b$" of the graph. As the piston 83 is driven to the left beyond top dead center by the incoming gas the chamber volume increases until the plunger is moved out of contact with the intake valve 86 allowing the intake valve 86 to seat (point "$b$"). At this time the expansion chamber 92 is completely sealed and the compressed gas extends as the piston 93 continues to move to the left. During this time the chamber volume increases and the gas pressure decreases (point "$b$" to point "$c$"). At the same time the temperature of the expanding gas decreases to provide refrigeration. At or near the end of the expansion stroke (point "$c$" of the graph) the stopper plate 109 on the end of the seated exhaust valve stem strikes the kicker bulkhead 94 to drive the exhaust valve 101 to the right in the valve guide, unseating the exhaust valve head 108 and opening the exhaust passageways 96. During the above-described expansion stroke the mechanical linkage 116 connected to project from the piston end wall is driven to the left and exerts a tension force on the right hand portion of a power take-off rod 117. As mentioned with reference to FIG. 1, the left hand portion of the power take-off rod 117 could be connected in tandem with a similar engine and would also be under tension. As illustrated in FIG. 1, a work absorber means 21 operates to pull the power take-off rod 117 to the right after the end of the expansion stroke (point "$c$") thereby placing the power take-off rod under mechanical tension during the entire cycle. On this return or exhaust stroke the piston 93 is drawn to the right, thereby decreasing the volume of the expansion chamber 92 (points "$c$" to "$d$" of the graph). At or near minimum chamber volume the exhaust valve 101 is again closed, as previously described (point "$d$") thereby sealing the expansion chamber and compressing the entrapped gas to build up chamber pressure (points "$d$" to "$a$" of the graph). At about top-dead-center the intake valve 86 is again opened and the above-described cycle repeated.

While the salient features of the invention have been illustrated and described with respect to particular embodiments it should be readily apparent that numerous modifications may be made within the spirit and scope of the invention and it is therefore not desired to limit the invention to the exact details shown.

What is claimed is:
1. An adiabatic expansion engine comprising:
   a housing having a bore extending axially therethrough;
   a cylinder having one closed end with a gas passageway formed through the closed end, said cylinder being mounted within the bore of said housing;
   a piston having a gas passageway extending from the head thereof longitudinally therethrough, said piston being mounted for reciprocal motion within and relative to said cylinder for forming an expansion chamber between the cylinder end wall and the piston;
   a normally closed valve reciprocally mounted to seat across one of the gas passageways;
   a normally open valve reciprocally mounted to seat across the other gas passageway, said normally closed valve being adapted to be opened and said normally open valve being adapted to be closed by direct mechanical coaction therebetween only when said piston is in close proximity to the closed end of said cylinder whereby compressed gas is directed into the expansion chamber through the now open said valve, said normally open valve being adapted to be opened by direct mechanical coaction between said reciprocating piston and cylinder when said piston is displaced remotely a predetermined distance from the closed end wall of said cylinder whereby expanded gas is exhausted from the expansion chamber through the now open said valve;

and power takeoff means connected to alternately transmit power from and to said reciprocal piston and cylinder means.

2. An adiabatic expansion engine of the type which runs on compressed gas comprising:

a housing having a bore extending therethrough;

a cylinder having a chamber formed therein and a gas passageway extending through an end wall, said cylinder being mounted within said housing;

a piston having a gas passageway extending longitudinally therethrough, said piston being mounted within the chamber of said cylinder, said piston and said cylinder being slidably mounted for low friction gas-tight axial movement relative to one another whereby the portion of the chamber in said cylinder between the piston and the end wall expands as the distance between the end wall and the piston increases;

a first valve mounted in said piston to seat across the gas passageway in said piston, said first valve being adapted to be unseated by direct mechanical contact with a relatively movable cylinder portion;

a second valve mounted in said cylinder to set across the gas passageway in the end wall of said cylinder, said second valve being adapted to be unseated by a direct mechanical contact with a relatively movable piston portion;

means connected to supply pressured gas to the chamber of said cylinder through an unseated one of said valves to move said piston and said cylinder relative to one another whereupon contact between said cylinder and said piston portions is lost thereby seating the unseated said valve;

the gas within said chamber further expanding whereupon said other valve unseats and opens when within a predetermined distance from the said cylinder end wall whereafter the expanded gas is exhausted from the expansion chamber through said open valve by returning said piston toward the end wall;

and power takeoff rod means connected to transmit power from said reciprocating piston and cylinder during expansion of the expansion chamber and to transmit power to said reciprocating piston and cylinder during exhaust of the expansion chamber.

3. A Claude cycle expansion engine comprising:

an outer housing having a bore formed axially therethrough and a bulkhead secured across the bore;

a cylinder having one closed end with a gas exhaust passageway formed axially through the closed end;

a piston having a piston head having a gas intake passageway extending therethrough, said piston being mounted for relative reciprocal motion within said cylinder to form an expansion chamber between the cylinder end wall and the piston head;

a first poppet valve mounted to project axially into the expansion chamber from the piston head;

spring bias means connected to seat said first poppet valve across the gas passageway in the piston head;

a second poppet valve mounted to project axially into the expansion chamber from the cylinder end wall;

second spring means connected to unseat said second valve from the gas passageway in the cylinder end wall;

a work absorber for converting reciprocal motion to rotary motion;

an energy transmitting rod connected between said cylinder and said work absorber for transmitting work to said work absorber when subjected to tension forces in a first direction and to receive work from said work absorber when subjected to tension forces in an opposite direction;

and means connected to supply pressurized gas through the piston passageway whereby said first poppet valve and said second poppet valve contact one another when the piston head is in close proximity to the end wall, whereupon said first poppet valve is opened and said second poppet valve is closed, whereafter both said valves remain closed until said piston head is positioned remotely from the cylinder end wall, whereupon the second poppet valve mechanically coacts with the bulkhead of said housing to open.

4. A Claude cycle expansion engine comprising:

an outer housing having a bore extending therethrough and a kicker bulkhead extending across the bore;

a cylinder having one closed end with a gas passageway formed through the closed end, said cylinder being reciprocally mounted within the bore of said housing;

a piston having a head with a gas passageway extending therethrough, said piston being slidably mounted within said cylinder and secured to said housing;

a first poppet valve mounted to seat across the gas passageway in the piston head;

a first spring means connected to normally seat said poppet valve across the gas passageway in the piston head;

a second poppet valve connected to seat across the gas passageway in the cylinder end wall;

a second spring means connected to normally unseat the second poppet valve from the gas passageway in the cylinder end wall;

a work absorber for converting reciprocal motion to rotary motion;

means for continuously supplying pressurized gas to the piston gas passageway;

and tension rod means connected between said reciprocating piston and said work absorber to transmit work from said piston to said work absorber when subjected to tension in one direction and to transmit work from said work absorber to said piston when subjected to tension in the other direction, whereby the first and the second said valves mechanically contact one another at the end of the work receiving cycle to open the seated valve allowing pressurized gas to enter the expansion chamber and to close the unseated valve preventing the escape of gas from the chamber, whereupon the cylinder is reciprocated relative to the piston, whereafter said second poppet valve mechanically coacts with the bulkhead of said housing to open and provide a path for gas escaping from the expansion chamber.

5. An expansion engine comprising:

a cylinder member having one closed end with a gas passageway formed through the closed end;

a piston member mounted for reciprocal motion within said cylinder member to form a variable volume expansion chamber, said piston member having a head with a gas passageway formed therethrough;

a work absorber means connected to alternately receive work from said reciprocating members during travel in one direction and to transmit work to said reciprocating members during travel in an opposite direction;

a first valve means reciprocally mounted and spanning the gas passageway in the head of said piston;

second valve means reciprocally mounted and spanning the gas passageway in the closd end wall of said cylinder member, said valve means being operable to coact with one another to first close one of said valve means and then open the other of said valve means as said piston approaches top dead center and to thereafter close the open said valve means as the piston travels from top dead center;

and a mechanical member connected to coact with and to open the said valve means which was first closed as said piston approaches bottom dead center.

6. An expansion engine comprising:

a cylinder member having one closed end with a gas passageway formed therethrough;

a piston member mounted for reciprocal motion within said cylinder member to form an expansion chamber, said piston member having a head with a gas passageway formed therethrough;
a normally closed valve reciprocally mounted in said piston head to span the gas passageway formed therein;
a normally open valve reciprocally mounted within the closed end of said cylinder and being adapted to seat across the gas passageway in the closed end, said valves being operable to mechanically contact one another as said piston member approaches top dead center to first close said normally open valve and then open said normally closed valve, said valves being further adapted to lose contact with one another and close said open valve after the piston member reciprocates past top dead center;
and a mechanical member mounted stationary relative to the members to mechanically contact and coact with said normally open valve to open the now closed normally open valve as the piston approaches bottom dead center.

7. An expansion engine comprising:
a cylinder member having one closed end with a gas exhaust passageway formed through the closed end;
a piston member mounted for reciprocal motion within said cylinder to form an expansion chamber therewith, said piston member having a head with a gas intake passageway formed therethrough;
a normally closed intake valve reciprocally mounted to seat across the gas intake passageway;
a normally open exhaust valve reciprocally mounted in the closed end of said cylinder in coaxial alignment with said intake valve, said exhaust valve being adapted to seat across the gas exhaust passageway in the closed cylinder end;
a spring biased plunger reciprocally mounted to retractably extend from the head of said exhaust valve into the expansion chamber whereby said plunger is operable to contact said normally closed intake valve and is retractably forced into said exhaust valve as said piston member approaches top dead center, said valves coacting to first close said normally open exhaust valve and to thereafter open said normally closed intake valve to transfer gas into the expansion chamber whereupon after top dead center said plunger is spring extended from the head of the exhaust valve to maintain the intake valve open until said plunger is fully extended and contact between the plunger and the intake valve is lost.

8. An expansion engine comprising:
a cylinder member having one closed end wall with a gas exhaust passageway formed through the closed end wall;
a piston member mounted for reciprocal motion within said cylinder to form an expansion chamber therewith, said piston member having a head with a gas intake passageway formed therethrough;
an intake valve reciprocally mounted to said piston member and resiliently biased toward the expansion chamber to a normally closed position across the gas intake passageway;
a normally open exhaust valve reciprocally mounted in the closed end wall of said cylinder in registry with said intake valve, said exhaust valve being adapted to seat across the gas exhaust passageway in the cylinder end wall;
a spring biased plunger reciprocally mounted to retractably extend from the head of said exhaust valve into the expansion chamber whereby said plunger is operable to contact said normally closed intake valve and is retractably forced into said exhaust valve as said piston member approaches top dead center, said valves coacting to first close said normally open exhaust valve and to thereafter open said normally closed intake valve to transfer gas into the expansion chamber whereupon after top dead center said plunger is spring extended from the head of the exhaust valve to maintain the intake valve open until said plunger is fully extended and contact between said plunger and said intake valve is lost.

9. An expansion engine comprising:
a cylinder member having one closed end wall with a gas exhaust passageway formed through the closed end wall;
a piston member mounted for reciprocal motion within said cylinder to form an expansion chamber therewith, said piston member having a head with a gas intake passageway formed therethrough;
an intake valve reciprocally mounted in said piston member and spring biased toward the expansion chamber to a normally closed position across the gas intake passageway;
a normally open exhaust valve reciprocally mounted in the closed end wall of said cylinder in axial registry with said intake valve, said exhaust valve being adapted to seat across the gas exhaust passageway in the cylinder end wall;
a plunger reciprocally mounted to retractably extend from the exhaust valve onto the expansion chamber, said plunger being spring biased in the extended position at a force greater than the spring bias of the intake valve whereby said plunger is operable to contact said normally closed intake valve and is retractably forced into said exhaust valve as the piston member approaches top dead center, said valves coacting to first close said normally open exhaust valve and to thereafter open said normally closed intake valve to transfer gas into the expansion chamber whereupon after top dead center said plunger is spring extended from the exhaust valve to maintain the intake valve open until said plunger is fully extended and contact between said plunger and said intake valve is lost.

10. An expansion engine comprising:
a cylinder member having one closed end wall with a gas exhaust passageway formed through the closed end wall;
a piston member mounted for reciprocal motion within said cylinder to form an expansion chamber therewith, said piston member having a head with a gas intake passageway formed therethrough;
an intake valve reciprocally mounted in said piston member;
first spring means connected to bias said intake valve toward the expansion chamber to a normally closed position across the gas intake passageway;
an exhaust valve reciprocally mounted in the closed end wall of said cylinder in registry with said intake valve, said exhaust valve being adapted to seat across the gas exhaust passageway in the closed cylinder end wall;
second spring means connected to bias said exhaust valve into a normally open position unseated from the gas exhaust passageway;
a plunger reciprocally mounted to retractably extend from said exhaust valve into the expansion chamber;
third spring means having a force greater than the force of said first spring means connected to bias said plunger in the expanded position whereby said plunger is operable to contact said normally closed intake valve and is retractably forced into said exhaust valve as the piston member approaches top dead center, said valves coacting to first close said normally open exhaust valve and to thereafter open said normally closed intake valve to transfer gas into the chamber whereupon after top dead center said plunger is spring biased to extend from the head of said exhaust valve to maintain said intake valve open until said plunger is fully extended and contact between said plunger and said intake valve is lost.

11. An expansion engine comprising:
a cylinder member having one closed end wall with a gas exhaust passageway formed through the closed end wall;
a piston member mounted for reciprocal motion within said cylinder to form an expansion chamber therewith, said piston member having a head with a gas intake passageway formed therethrough;
an intake valve reciprocally mounted to said piston member;
first spring means connected to bias said intake valve toward the expansion chamber to a normally closed position across the gas intake passageway;
an exhaust valve reciprocally mounted in the closed end wall of said cylinder in registry with said intake valve, said exhaust valve being adapted to seat across the gas exhaust passageway in the closed cylinder end wall;
second spring means connected to bias said exhaust valve into a normally open position unseated from the gas exhaust passageway;
a plunger reciprocally mounted to retractably extend from said exhaust valve into the expansion chamber;
third spring means having a force greater than the force of said first or said second spring means being connected to bias said plunger to the extended position whereby said plunger is operable to contact said normally closed intake valve and is retractably forced into said exhaust valve as the piston member approaches top dead center, said valves coacting to first close said normally open exhaust valve and to thereafter open said normally closed intake valve to transfer gas into the chamber whereupon after top dead center said plunger is spring biased to extend from said exhaust valve to maintain said intake valve open until said plunger is fully extended and contact between said plunger and said intake valve is lost.

12. An expansion engine comprising:
a cylinder member having one closed end wall with a gas exhaust passageway formed through the closed end wall;
a piston member mounted for reciprocal motion within said cylinder to form an expansion chamber therewith, said piston member having a high pressure gas intake passageway formed through the piston head;
an intake valve reciprocally mounted to said piston member and spring biased toward the expansion chamber to a normally closed position across the gas intake passageway;
a normally open exhaust valve reciprocally mounted at the closed end wall of said cylinder in registry with said intake valve, said exhaust valve being adapted to seat across the gas exhaust passageway in the cylinder end wall;
a plunger reciprocally mounted to retractably extend from the exhaust valve into the expansion chamber, said plunger being spring biased in the extended position at a force greater than the spring bias of the intake valve whereby said plunger is operable to contact said normally closed intake valve and is retractably forced into said exhaust valve as said piston member approaches top dead center, said valves coacting to first close said normally open exhaust valve and to thereafter open said normally closed intake valve to transfer gas into the expansion chamber whereupon after top dead center said plunger is spring extended from said exhaust valve to maintain said intake valve open until said plunger is fully extended and contact between said plunger and said intake valve is lost;
a mechanical member mounted stationary relative to said members and connected to mechanically contact and coact with said spring biased open exhaust valve to open the now closed exhaust valve as the members approach bottom dead center.

13. An expansion engine comprising:
a cylinder member having one closed end wall with a gas exhaust passageway formed through the closed end wall;
a piston member mounted for reciprocal motion within said cylinder to form an expansion chamber therewith, said piston member having a high pressure gas intake passageway formed through the piston head;
an intake valve reciprocally mounted to said piston member and spring biased toward the expansion chamber to a normally closed position across the gas intake passageway;
a normally open exhaust valve reciprocally mounted in the closed end wall of said cylinder in alignment with said intake valve, said exhaust valve being adapted to seat across the gas passageway in the closed cylinder end wall;
a plunger reciprocally mounted to retractably extend from said exhaust valve into the expansion chamber, said plunger being spring biased to the extended position at a force greater than the spring bias of the intake valve whereby said plunger is operable to contact said normally closed intake valve and is retractably forced into said exhaust valve as said piston member approaches top dead center, said valve coacting to first close said normally open exhaust valve and to thereafter open said normally closed intake valve against gas pressure to transfer gas into the expansion chamber whereupon after top dead center said plunger is spring extended from said exhaust valve to maintain said intake valve open until said plunger is fully extended and contact between said plunger and said intake valve is lost;
a mechanical member mounted stationary relative to said members and connected to mechanically contact and coact with said spring biased exhaust valve to open the now closed exhaust valve as said members approach bottom dead center;
a work absorber including a connecting rod connected to pull said cylinder member in a first direction to transfer work from the work absorber to said engine and to pull said work absorber in the opposite direction to transfer work from said cylinder to said work absorber.

14. An expansion engine comprising:
a cylinder member having one closed end with a gas passageway formed therethrough;
a piston member mounted for reciprocal motion within said cylinder member to form an expansion chamber, said piston member having a head with a gas passageway formed therethrough;
a normally open valve reciprocally mounted in said piston head to span the gas passageway formed therein;
a normally closed valve reciprocally mounted within the closed end of said cylinder and being adapted to seat across the gas passageway therein, said valves being operable to mechanically contact one another as said piston member approaches top dead center to first close said normally open valve and then open said normally closed valve, said valves being further adapted to lose contact with one another and close said open valve after the piston member reciprocates past top dead center;
and a mechanical member mounted stationary relative to said members and connected to mechanically contact and coact with said normally open valve to open the now closed normally open valve as the piston member approaches bottom dead center.

15. An expansion engine comprising:
a cylinder member having one closed end with a gas passageway formed therethrough;
a piston member mounted for reciprocal motion within said cylinder member to form an expansion chamber, said piston member having a head with a gas passageway formed therethrough;
a normally open valve reciprocally mounted in said piston head to span the gas passageway formed therein;
a normally closed valve reciprocally mounted within the closed end of said cylinder and being adapted to seat across the gas passageway therein, said valves being operable to mechanically contact one another as said piston member approaches top dead center to first close said normally open valve and then open said normally closed valve, said valves being further adapted to lose contact with one another and close the now open normally closed valve after the piston member reciprocates beyond top dead center;
a mechanical member mounted stationary relative to said piston and connected to mechanically contact and coact with said normally open valve to open the now closed normally open said valve as the piston member approaches bottom dead center;
and a work absorber means including a power takeoff rod interconnected to said piston member whereby travel of the piston member in a first direction pulls the rod to transfer work to said work absorber and whereafter said work absorber pulls the rod in an opposite direction to transfer work to said piston.

16. A refrigeration system comprising:
a first expansion engine and a second expansion engine;
a source of compressed gas;
a countercurrent heat exchanger connected to receive compressed gas from said source and to supply a portion of the received gas to the first said expansion engine and the remaining portion of the received gas to the other said expansion engine, said countercurrent heat exchanger being further connected to receive the expanded cold gases from said engines;
tension rod means interconnecting said engines in tandem to alternately transfer work from one engine to the other under mechanical tension;
a work absorber means;
and a power take-off rod connected to alternately transfer work from said engines to said work absorber and from said work absorber to said engine.

17. An expansion engine comprising:
a cylinder member having a gas passageway formed therethrough;
a piston member within the cylinder member having a gas passageway formed therethrough;
said members being arranged for relative reciprocal motion therebetween;
a first valve reciprocally mounted on one of said members to span the gas passageway therein;
a second valve reciprocally mounted within the other of said members and being adapted to span the gas passageway therein;
said valves being operable to mechanically contact one another as the said relative motion brings said piston member to top dead center to first close one valve and then open the other valve;
said valves being adapted to lose contact with one another and close said open valve after reciprocation brings the piston member past top dead center;
and a stationary mechanical member to contact and open the now closed valve as the piston approaches bottom dead center.

18. In an expansion engine having a cylinder with a gas passageway formed therethrough:
a piston member within the cylinder member;
said members being arranged for relative movement therebetween to define a variable volume gas expansion chamber;
said piston member having a gas passageway formed therethrough;
a source of high pressure gas communicating with one of said gas passageways;
said gas passageways being arranged for selective communication with said expansion chamber;
a first valve reciprocally mounted in one of the members to span the gas passageway and open and close same;
a second valve reciprocally mounted within the other of said members to span the gas passageway formed therethrough and open and close same;
said valves being operable to mechanically contact one another as said relative motion brings said piston member to top dead center to first close one valve and then open the other valve;
said valves being further adapted to lose contact with one another and close said open valve after relative reciprocation brings the piston member past top dead center;
and means cooperating with the now closed valve to open same as the piston approaches bottom dead center.

19. In an expansion engine telescopically arranged cylinder and piston members mounted for relative reciprocal movement therebetween and defining a variable volume expansion chamber;
gas passageways formed through the respective members;
a source of high pressure gas communicating with at least one of said gas passageways;
first valve means reciprocally mounted in one of the members to accommodate opening and closing of the gas passageway formed therein;
second valve means reciprocally mounted in the other of said members to accommodate opening and closing of the gas passageway formed therein;
one of said valves being normally open and the other of said valves being normally closed;
said valves being operable to mechanically contact one another as the said reciprocal motion brings the piston member to top dead center relative to the cylinder member to first close said normally open valve and then open the normally closed valve;
said valves being further adapted to lose contact with one another and close said now open valve after said relative reciprocation brings the piston member past top dead center;
and means cooperating with the now closed valve to open same as the piston approaches bottom dead center.

20. An expansion engine according to claim 19, wherein said cooperating means comprises a stationary member carried by the engine adapted to directly engage the closed normally open valve and open same as the piston approaches bottom dead center.

No references cited.

WILLIAM J. WYE, *Primary Examiner.*